April 3, 1956  D. H. JACOBS  2,740,952

MEANS FOR MEASURING ANGULAR DISTANCES

Filed June 25, 1952

INVENTOR
Donald H. Jacobs

United States Patent Office 2,740,952
Patented Apr. 3, 1956

2,740,952

MEANS FOR MEASURING ANGULAR DISTANCES

Donald H. Jacobs, Brookdale, Md.

Application June 25, 1952, Serial No. 295,590

3 Claims. (Cl. 340—206)

This invention relates to a means for measuring angular distances.

It is desired to measure the angle between two arms, each being rotatable about a common center. However it would involve only a slight modification to make one arm fixed in position and thus measure the angular position of a single rotary arm, or of a rotary shaft, relative to a fixed reference point.

This application involves some features in common with my application 239,259, filed 30 July 1951, now Patent No. 2,734,188, isued February 7, 1956, and may be considered as a continuation in part of said application.

Figure 1:
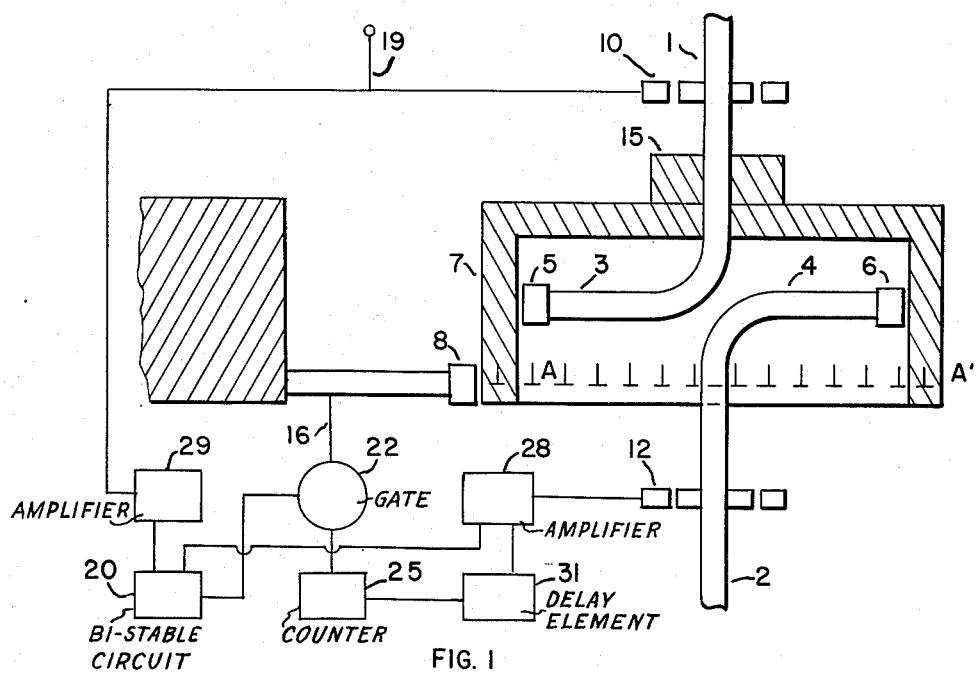
Fig. 1 is a diagrammatic view of the invention, showing the measuring drum in diametrical section.
Figure 2:
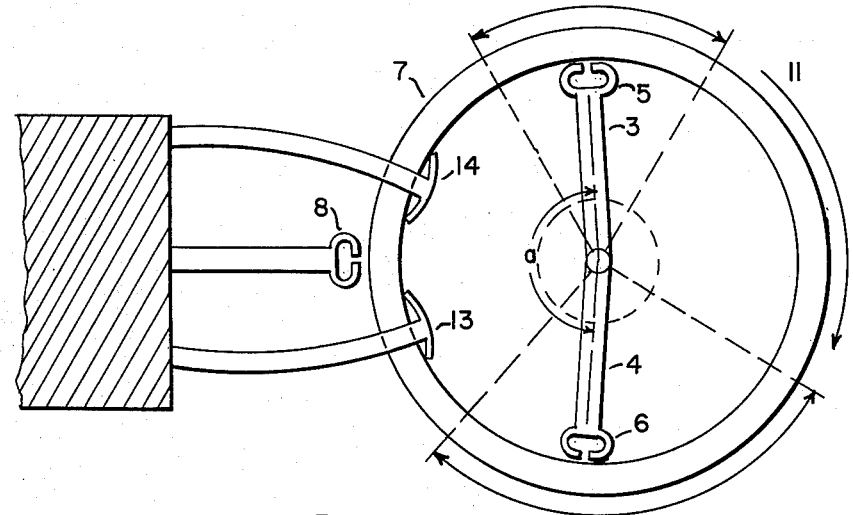
Fig. 2 is a schematic plan view of the movable parts of the invention.

The general solution of the problem is shown in schematic form in Figs. 1 and 2. Shafts 1 and 2 are free to rotate to a limited extend around a common center line. Shafts 1 and 2 carry radial projecting arms 3 and 4. On the end of arm 3 is mounted a magnetic recording head 5 while arm 4 carries on its end a magnetic read-out head 6. The shafts are free to rotate around their longitudinal centers within the limits indicated by the dotted lines and the double-headed arrows in Fig. 2.

A drum 7 is mounted to rotate around the ends of shafts 1 and 2 and their projecting arms. This drum has its outer and inner cylindrical surfaces coated with a magnetic recording material which may be applied by electroplating or spraying or in any desired manner.

The outer periphery of the drum 7 carries a series of equally spaced magnetic pulses recorded along the line indicated at A—A' in Fig. 1. The distance between the pulses is so chosen that the angle which any two adjacent pulses subtend at the center of the drum is equal to or less than the accuracy with which it is desired to measure the angle $a$ (Fig. 2) between the center lines of the arms 3 and 4. In other words, the angle $a$ is to be measured by counting the number of angular units, each consisting of the angle subtended by two adjacent pulses, of which it consists. These recorded pulses are read by read-out head 8 mounted on the frame of the machine.

The angle $a$ is measured by counting the number of pulses in the output of read-out head 8 which occur while the drum is rotating so that a given point thereon moves from a position opposite recording head 5 to a position opposite read-out head 6. It is intended that this measurement be performed whenever a signal is received by the device, and this signal is given when the measurement is desired for use in apparatus connected to the device of the present invention.

When this angle measurement is desired, a signal is sent to the recording head 5 along line 19, and head 5 then prints or records a single magnetic pulse on the interior of the drum 7. The pulse energy is introduced to shaft 1 by R. F. coupling through coupling coils 10, avoiding any torque that might be introduced by the use of slip rings. Slip rings may be used if desired, however. At the same time that it is recorded, the pulse passes through amplifier 29 and bi-stable circuit 20 to gate 22 and opens this gate so that pulses picked up by read-out head 8 and reaching gate 22 on line 16 can pass through the gate to counter 25.

Thereafter the pulses from read-out head 8 are continuously counted until the pulse recorded on the interior of the drum reaches read-out head 6 on rotary arm 4 and induces a pulse in the output of this head. This pulse is transmitted without torque off of shaft 2 via R. F. coupling coils 12 (or slip rings may be used if desired), and passes by way of amplifier 28 and bi-stable circuit 20 to gate 22, closing the gate against further passage of pulses from read-out head 8.

The counter 25 will now contain $n$ counts, representative of the distance between the positions of arm 3 and of arm 4, considered as a reference mark. The closing pulse from amplifier 28 will also pass to delay element 31 which after an appropriate delay sends a clearing pulse to counter 25 to reset the counter to zero, ready for the next determination. Alternately, the clear pulse may come from an external source.

The operation of elements 20 to 31, including the counter and the control elements therefor, is described in more detail in application 239,259, referred to above.

It will be noted that with this device there is no need to provide mechanism to insure that the motor which drives the drum 7 shall run at a constant speed. The angle measurement is a correct indication of the distance between the two arms regardless of any fluctuations in the speed of the motor, since it measures the angular distance between the original position of the mark and its final position. The speed of the drum need merely be kept sufficiently high so that a measurement can be made each time it is demanded by a pulse on the recording head and not so high that read-out head 8 and its associated counting circuits cannot keep up with the pulses being counted, i. e., the rate at which the pulses need to be counted must not exceed the limits imposed by the counting mechanism. In practice only very moderate control of the drum speed is required.

After the pulse recorded on the interior of the drum passes read-out head 6 it is no longer useful. It then passes one or more erasing heads 13, 14 mounted on the frame of the machine and is removed from the drum, to place the apparatus in condition for a new angle measurement, when requested.

The element which carries the series of pulses to be counted and which receives the initiating pulse to be recorded and erased has been shown as a hollow drum having a hub 15 which may be arranged to be engaged by any appropriate driving mechanism. There may be some problems involved in getting the drum properly mounted and driven without interference with shafts 1 and 2, and it may prove desirable to use some other mechanical arrangement embodying the same basic principle. For example, the drum may be replaced with a disc, on which pulses can be recorded on either face, or on the periphery.

It is obvious that while the reference head 6 in the present disclosure has been shown as mounted on a moving arm, this reference point 6 might equally as well be fixed in position and the mechanism herein disclosed might thus be used to determine the angular position of a rotary shaft relative to this stationary reference point. While there has been shown and described by way of example the means above disclosed for carrying out the invention, it is obvious that the fundamental novel features thereof could be embodied in many other widely differing structures without departing from the spirit of the invention. It is to be understood, therefore, that my

Having thus described my invention, I claim:

1. Means for determining the variable angular position of one shaft relative to the variable angular position of another shaft coaxial therewith comprising a drum rotatably mounted concentric with said shafts, a radial arm on each shaft exending into proximity to a surface of said drum, a magnetic recording head on one arm, a magnetic reading head on the other arm, means for sending a signal pulse to the first arm and thereby making a magnetic mark on said surface, means operated by the other shaft for reading the mark, and means for transmitting a series of pulses proportional in number to the interval between the marking and reading arms.

2. Means for determining the variable angular position of a rotary shaft comprising a member mounted to rotate coaxially with said shaft, a series of sensitized portions equally spaced around said member, means sensitive to said sensitized portions for receiving impulses therefrom, a gate connected to said receiving means, a radial arm on said shaft extending close to said member, means on said arm to impress a mark on said member, means for sending a signal to said arm to impress a mark upon said member, and means to open said gate substantially simultaneously with the impression of said mark, a second rotary shaft coaxial with said first mentioned shaft and carrying a reading head in proximity to said member for reading said mark and means for closing said gate when said mark and said reading head move past each other, whereby a series of impulses from said receiving means will pass through said gate proportional in number to the distance between said arm and said reading head.

3. Means for determining the variable angular position of a rotary shaft comprising a member mounted to rotate coaxially with said shaft, a series of sensitized portions equally spaced around said member, means sensitive to said sensitized portions for picking up impulses therefrom, a projecting arm on said shaft extending close to said member, means on said arm to impress a mark on said member, connections for sending a signal to said arm to impress a mark on said member, a second rotary shaft coaxial with the first mentioned shaft and carrying a reading head in proximity to said member for reading said mark, and means for counting the impulses picked up by said sensitive means during that portion only of a rotation of said member while the mark impressed thereon is moving between said arm and said reading head.

References Cited in the file of this patent

UNITED STATES PATENTS

| | | |
|---|---|---|
| 2,168,149 | Arnold | Aug. 1, 1939 |
| 2,439,446 | Begun | Apr. 13, 1948 |
| 2,623,936 | Kennedy et al. | Dec. 30, 1952 |
| 2,680,241 | Gridley | June 1, 1954 |

OTHER REFERENCES

Industrial Laboratories, February 1952 (page 69).